United States Patent
Long

(10) Patent No.: US 11,117,408 B2
(45) Date of Patent: Sep. 14, 2021

(54) METHOD AND SYSTEM FOR MULTI-OBJECT UNIVERSAL INTELLIGENT PRINTING

(71) Applicant: HEFEI AIRWREN AUTOMATIC EQUIPMENT CO., LTD., Anhui (CN)

(72) Inventor: Mei Long, Anhui (CN)

(73) Assignee: HEFEI AIRWREN AUTOMATIC EQUIPMENT CO., LTD., Anhui (CN)

( * ) Notice: Subject to any disclaimer, the term of this patent is extended or adjusted under 35 U.S.C. 154(b) by 412 days.

(21) Appl. No.: 16/309,462

(22) PCT Filed: Oct. 31, 2018

(86) PCT No.: PCT/CN2018/112970
§ 371 (c)(1),
(2) Date: Dec. 13, 2018

(87) PCT Pub. No.: WO2019/184336
PCT Pub. Date: Oct. 3, 2019

(65) Prior Publication Data
US 2021/0155024 A1    May 27, 2021

(30) Foreign Application Priority Data
Mar. 30, 2018 (CN) .......................... 201810294166.7

(51) Int. Cl.
*B41M 1/26* (2006.01)
*G06F 3/12* (2006.01)
(Continued)

(52) U.S. Cl.
CPC .................. *B41M 1/26* (2013.01); *B41J 3/54* (2013.01); *B41M 1/20* (2013.01); *B41M 5/0011* (2013.01);
(Continued)

(58) Field of Classification Search
CPC ........ B41M 1/26; B41M 1/20; B41M 5/0011; B41M 5/0047; G06F 3/1256; G06F 3/1208; B41J 3/54; B41J 11/0005; B41J 29/377

See application file for complete search history.

(56) References Cited

U.S. PATENT DOCUMENTS

2008/0271624 A1* 11/2008 Kobayashi ............... B41F 23/06
101/230
2015/0066189 A1*  3/2015 Mulligan ........... G06Q 30/0621
700/136

(Continued)

*Primary Examiner* — Yaovi M Ameh
(74) *Attorney, Agent, or Firm* — JCIPRNET

(57) ABSTRACT

The present application discloses a method and a system for multi-object universal intelligent printing, the method includes: collecting a real-time image of an object to be printed, and displaying the real-time image of the object to be printed to the user in real time; moving a print head to a designated position according to a mobile nozzle command input after the user browses the real-time image; obtaining a print pattern input by the user; printing the print pattern onto the object to be printed through the print head. The system includes: a collection module, configured for collecting a real-time image of an object to be printed; a display module, configured for displaying the real-time image of the object to be printed to the user in real time; a nozzle moving module, configured for moving a print head to a designated position according to a mobile nozzle command input after the user browses the real-time image; an obtaining module, configured for obtaining a print pattern input by the user; a spraying module, configured for printing the print pattern onto the object to be printed through a print head.

7 Claims, 2 Drawing Sheets

(51) Int. Cl.
*B41J 3/54* (2006.01)
*B41M 1/20* (2006.01)
*B41M 5/00* (2006.01)
B41J 11/00 (2006.01)
B41J 29/377 (2006.01)

(52) U.S. Cl.
CPC .......... *G06F 3/1208* (2013.01); *G06F 3/1256* (2013.01); *B41J 11/0005* (2013.01); *B41J 29/377* (2013.01); *B41M 5/0047* (2013.01)

(56) References Cited

U.S. PATENT DOCUMENTS

| | | | |
|---|---|---|---|
| 2015/0124034 A1* | 5/2015 | Shinoda | B41J 11/0015 347/104 |
| 2015/0332091 A1* | 11/2015 | Kim | G06K 9/00 382/103 |

* cited by examiner

METHOD AND SYSTEM FOR MULTI-OBJECT UNIVERSAL INTELLIGENT PRINTING

The present application claims priority to Chinese Patent Application No. 201810294166.7, filed to the Chinese Patent Office on Mar. 30, 2018, entitled "Method and system for multi-object universal intelligent printing", the entire disclosure of which is incorporated herein by reference.

TECHNICAL FIELD

The present application relates to the field of printer technology, and in particular, to a method and a system for multi-object universal intelligent printing.

BACKGROUND OF THE INVENTION

With the rapid development of technology level, traditional printing can not meet the individual needs of customers, some customers want to print their favorite patterns on the favorite items to show personality and fashion. Clothes printers, mobile phone shell printers and cup printers came into being. However, the workflow of these printers is as follows: coating on the printed parts, heat transfer processing, printing, and natural drying. However, in this mode of operation, the position and pattern of the print need to be prepared in advance, and then the item (object) to be printed is manually placed at the designated position for printing, the position of the print and the printed pattern cannot be adjusted and changed in real time.

SUMMARY OF THE INVENTION

Based on the technical problems existing in the background art, the present application discloses a method and a system for multi-object universal intelligent printing.

The present application proposes a method for multi-object universal intelligent printing, which includes:

S1. collecting a real-time image of an object to be printed, and displaying the real-time image of the object to be printed to the user in real time;

S2. moving a print head to a designated position according to a mobile nozzle command input after the user browses the real-time image;

S3. obtaining a print pattern input by the user;

S4. printing the print pattern onto the object to be printed through the print head.

In a preferred technical scheme, in S1, before collecting the real-time image of the object to be printed, it further includes:

performing air blowing to remove impurities on the object to printed;

flattening the object to be printed after air blowing to remove impurities.

In a preferred technical scheme, S2 specifically includes: collecting the real-time image of the object to be printed by a movable camera, and displaying a real-time image of the object to be printed to the user in real time through a display.

A system for multi-object universal intelligent printing, which includes:

a collection module, configured for collecting a real-time image of an object to be printed;

a display module, configured for displaying the real-time image of the object to be printed to the user in real time;

a nozzle moving module, configured for moving a print head to a designated position according to a mobile nozzle command input after the user browses the real-time image;

an obtaining module, configured for obtaining a print pattern input by the user;

a spraying module, configured for printing the print pattern onto the object to be printed through a print head.

In a preferred technical scheme, a pre-processing module is further included, and is connected to the collection module. The pre-processing module is configured for performing air blowing to remove impurities on the object to be printed, and flattening the object to be printed after air blowing to remove impurities, before the real-time image of the object to be printed is collected by the collection module.

In a preferred technical scheme, the collection module is specifically configured for collecting the real-time image of the object to be printed by using a movable camera.

In a preferred technical scheme, the display module is specifically configured for displaying the real-time image of the object to be printed to the user in real time through a display.

The present application collects a real-time image of an object to be printed, and displays the real-time image of the object to be printed to the user in real time, moves a print head to a designated position according to a mobile nozzle command input after the user browses the real-time image, obtains a print pattern input by the user, prints the print pattern onto the object to be printed through the print head. In this way, the image of the object to be printed is collected in real time for the user to browse, and the user can manually specify the position to be printed and the printed pattern, which makes the printing process more intelligent, so that the printed product is more in line with the customer's needs. Making customers to fully understand the items to be printed (object) before printing, will reduce the printing error rate and improve printing efficiency.

DETAILED DESCRIPTION OF THE INVENTION

Figure 1:
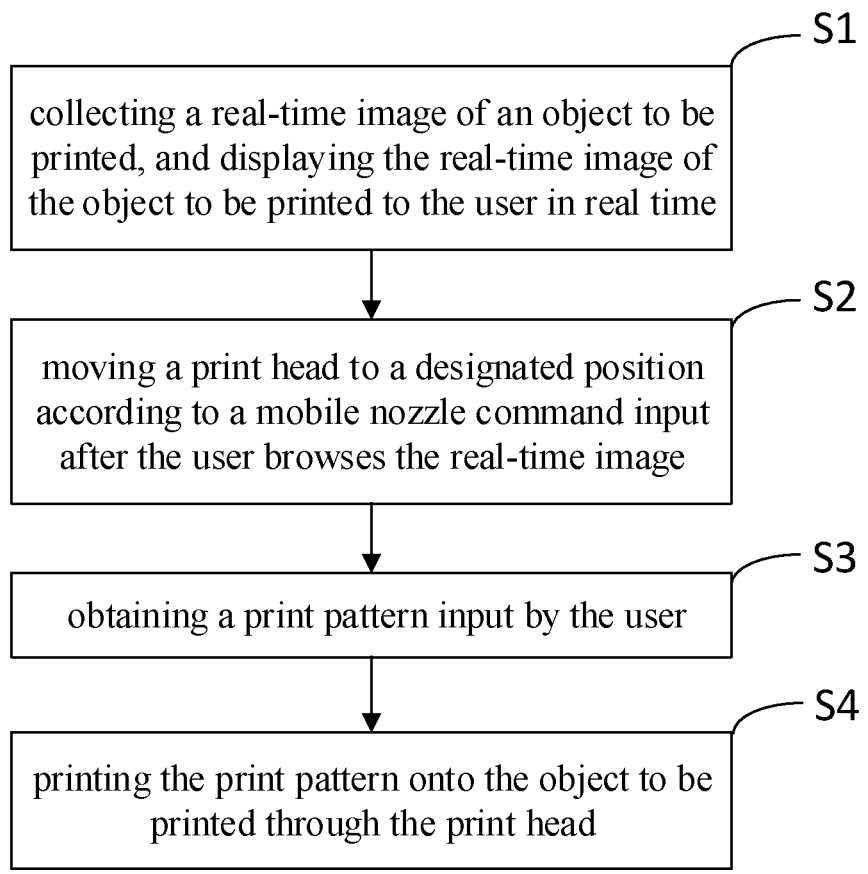
FIG. 1 is a schematic flow chart of a method for multi-object universal intelligent printing.

Referring to FIG. 1, the present application proposes a method for multi-object universal intelligent printing, which includes:

S1. collecting a real-time image of an object to be printed, and displaying the real-time image of the object to be printed to the user in real time;

Specifically, before collecting the real-time image of the object to be printed, it further includes: performing air blowing to remove impurities on the object to printed; flattening the object to be printed after air blowing to remove impurities.

In a specific embodiment, the object to be printed is arranged in a preset area, the object to be printed is performed blowing to remove impurities and flattening, and the real-time image of the object to be printed is displayed for the user in real time, so that the customer fully understands the object (item) to be printed.

S2. moving a print head to a designated position according to a mobile nozzle command input after the user browses the real-time image; which specifically includes: collecting the real-time image of the object to be printed by a movable camera, and displaying a real-time image of the object to be printed to the user in real time through a display.

S3. obtaining a print pattern input by the user;

S4. printing the print pattern onto the object to be printed through the print head.

In a specific embodiment, the print position is adjusted according to the customer's needs, until the customer finds the position that suits his or her favorite. After the user inputs the pattern of the favorite, the print pattern is printed on the object to be printed to complete the printing.

Figure 2:
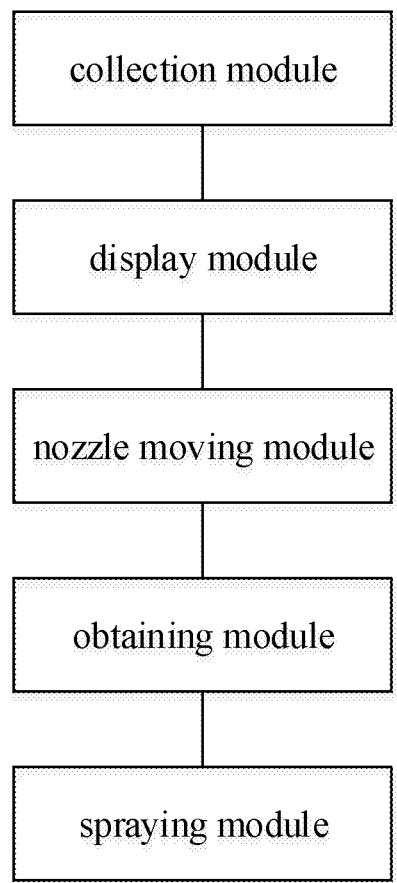
FIG. 2 is a schematic block diagram of a system for multi-object universal intelligent printing.

Referring to FIG. 2, the present application proposes a system for multi-object universal intelligent printing, which includes:

a collection module, configured for collecting a real-time image of an object to be printed; the collection module is specifically configured for collecting the real-time image of the object to be printed by using a movable camera.

A pre-processing module is connected to the collection module, the pre-processing module is configured for performing air blowing to remove impurities on the object to be printed, and flattening the object to be printed after air blowing to remove impurities, before the real-time image of the object to be printed is collected by the collection module.

A display module is configured for displaying the real-time image of the object to be printed to the user in real time; the display module is specifically configured for displaying the real-time image of the object to be printed to the user in real time through a display.

In a specific embodiment, the object to be printed is arranged in a preset area, the object to be printed is performed blowing to remove impurities and flattening, and the real-time image of the object to be printed is displayed for the user in real time, so that the customer fully understands the object (item) to be printed.

A nozzle moving module is configured for moving a print head to a designated position according to a mobile nozzle command input after the user browses the real-time image.

An Obtaining module is configured for obtaining a print pattern input by the user.

A spraying module is configured for printing the print pattern onto the object to be printed through a print head.

In a specific embodiment, the print position is adjusted according to the customer's needs, until the customer finds the position that suits his or her favorite. After the user inputs the pattern of the favorite, the print pattern is printed on the object to be printed to complete the printing.

The present application collects a real-time image of an object to be printed, and displays the real-time image of the object to be printed to the user in real time, moves a print head to a designated position according to a mobile nozzle command input after the user browses the real-time image, obtains a print pattern input by the user, prints the print pattern onto the object to be printed through the print head. In this way, the image of the object to be printed is collected in real time for the user to browse, and the user can manually specify the position to be printed and the printed pattern, which makes the printing process more intelligent, so that the printed product is more in line with the customer's needs. Making customers to fully understand the items to be printed (object) before printing, will reduce the printing error rate and improve printing efficiency.

The above is only the preferred embodiment of the present application, but the scope of protection of the present application is not limited thereto, and any equivalents or modifications of the technical solutions of the present application and the application concept thereof should be included in the scope of the present application within the scope of the technical scope of the present application.

What is claimed is:

1. A method for multi-object universal intelligent printing, characterized by, comprising:
    S1. collecting a real-time image of an object to be printed, and displaying the real-time image of the object to be printed to a user in real time;
    S2. moving a print head to a designated position according to a mobile nozzle command input after the user browses the real-time image;
    S3. obtaining a print pattern input by the user;
    S4. printing the print pattern onto the object to be printed through the print head.

2. The method for multi-object universal intelligent printing according to claim 1, characterized in that, in the step S1, before collecting the real-time image of the object to be printed, it further comprises:
    performing air blowing to remove impurities on the object to be printed;
    flattening the object to be printed after air blowing to remove impurities.

3. The method for multi-object universal intelligent printing according to claim 1, characterized in that, the step S2 specifically comprises: collecting the real-time image of the object to be printed by a movable camera, and displaying a real-time image of the object to be printed to the user in real time through a display.

4. A system for multi-object universal intelligent printing, characterized by, comprising:
    a collection module, configured for collecting a real-time image of an object to be printed;
    a display module, configured for displaying the real-time image of the object to be printed to a user in real time;
    a nozzle moving module, configured for moving a print head to a designated position according to a mobile nozzle command input after the user browses the real-time image;
    an obtaining module, configured for obtaining a print pattern input by the user;
    a spraying module, configured for printing the print pattern onto the object to be printed through a print head.

5. The system for multi-object universal intelligent printing according to claim 4, characterized by, further comprising a pre-processing module, which is connected to the collection module, the pre-processing module is configured for performing air blowing to remove impurities on the object to be printed, and flattening the object to be printed after air blowing to remove impurities, before the real-time image of the object to be printed is collected by the collection module.

6. The system for multi-object universal intelligent printing according to claim 4, characterized in that, the collection module is specifically configured for collecting the real-time image of the object to be printed by using a movable camera.

7. The system for multi-object universal intelligent printing according to claim 4, characterized in that, the display module is specifically configured for displaying the real-time image of the object to be printed to the user in real time through a display.

* * * * *